United States Patent
Torok et al.

[11] 3,752,563
[45] Aug. 14, 1973

[54] MAGNETIC FILM STRIPE DOMAIN DIFFRACTION

[75] Inventors: Ernest J. Torok; David S. Lo; David I. Norman, all of St. Paul, Minn.

[73] Assignee: Sperry Rand Corporation, New York, N.Y.

[22] Filed: Sept. 1, 1971

[21] Appl. No.: 177,081

Related U.S. Application Data

[63] Continuation of Ser. No. 13,547, Feb. 24, 1970, abandoned.

[52] U.S. Cl. ....... 350/151, 340/174 YC, 350/162 R
[51] Int. Cl. ............................. G02f 1/22
[58] Field of Search ............. 350/150, 151, 162 R

[56] References Cited
UNITED STATES PATENTS

| | | | |
|---|---|---|---|
| 3,347,614 | 10/1967 | Fuller et al. | 350/151 |
| 3,545,843 | 12/1970 | Somers et al. | 350/151 |
| 3,508,215 | 4/1970 | Cohler et al. | 350/151 |
| 3,167,751 | 1/1965 | Kelner et al. | 350/151 |
| 3,422,269 | 1/1969 | DiChen | 350/151 |
| 3,599,189 | 8/1971 | Hadden, Jr. et al. | 350/151 |

OTHER PUBLICATIONS
Boersch et al., "Zur Beugung des Lichtes an Magnetisierungsstrukturen" Z. Physik Vol. 177 (1964) PP. 157–163.
Lambeck, "Zur Abbildung von Magnetisierungsstrukturen mit dem Faraday–und Kerr–Effect" Z. Physik Vol. 179 (1964) pp. 161–181.
Cassidy, "Magneto–Optically Generated Inputs in Optical Data Processing" J. Opt. Soc. Am. Vol. 61, No. 3 (Mar. 1971) pp. 378–385.

*Primary Examiner*—John K. Corbin
*Attorney*—Kenneth T. Grace, Thomas J. Nikolai and John P. Dority

[57] ABSTRACT

A magneto-optic light deflection system that utilizes the stripe domains in a magnetic film as a diffraction grating. The angle of deflection of the light from the plane of the film is varied in two dimensions by varying the separation and orientation of the stripe domains. The wall separation is varied by varying the intensity of a DC field in the plane of the film parallel to the stripe domains, or by varying the intensity of a DC field normal to the plane of the film. The orientation of the stripe domains is varied by varying the direction of the DC field in the film plane. Hysteresis is overcome by an AC tickle field perpendicular to the stripe domains.

17 Claims, 20 Drawing Figures

PATENTED AUG 14 1973

INVENTORS
ERNEST J. TOROK
DAVID S. LO
DAVID I. NORMAN

BY Kenneth T Grace
ATTORNEY

- 1'st ORDER UPWARD
- 0'th ORDER
- 1'st ORDER DOWNWARD

MAGNETIC FILM STRIPE DOMAIN DIFFRACTION

CROSS REFERENCE TO RELATED APPLICATION

The present application is a continuation application of the parent application Ser. No. 13,547, filed Feb. 24, 1970, now abandoned.

BACKGROUND OF THE INVENTION

The present invention relates to thin-magnetizable-films and their application as magneto-optical deflectors. In the prior art, it is known that light will be diffracted by a diffraction grating. See the text "Fundamentals of Optics," Second Edition, Jenkins and White, McGraw-Hill Book Company 1955. More recent studies with thin-magnetizable-films having a stripe domain magnetization configuration have utilized Bitter patterns formed by colloids of magnetizable powder collected along the domain walls while variable stripe domain spacing has been achieved by strond DC fields orthogonal to the plane of the film. See the text "Ferromagnetism and Ferromagnetic Domains," Craik and Tebble, Holland Publishing Company, Amsterdam, John Wiley and Sons, Inc., Volume 4, 1965. These light deflectors are limited to substantially two states, minimum and maximum, of diffracted light conditions as optical display systems. See the publication "Stripe Domains in Thin Magnetic Films and Their Application to Magneto-Optical Displays," R. J. Spain and H. W. Fuller, Journal of Applied Physics, Vol. 37, No. 3, Mar. 1, 1966, pages 953 – 959. The present invention is directed toward methods of controlling the stripe domain configuration and obtaining the desired deflection via the Kerr and Faraday effects upon a monochromatic light beam that is directed upon the plane of the film.

SUMMARY OF THE INVENTION

The present invention is directed toward a light deflector system that utilizes the domain walls between stripe domains in a magnetic film as diffraction gratings. Means are provided to vary the separation of adjacent domain walls, i.e., the width of the stripe domains, and the rotatable orientation of the parallel stripe domains. The resulting system is utilized to control, by the Kerr or Faraday effect, the focus of a light beam that is directed upon the plane of the film.

DESCRIPTION OF THE PREFERRED EMBODIMENTS

Figure 1:
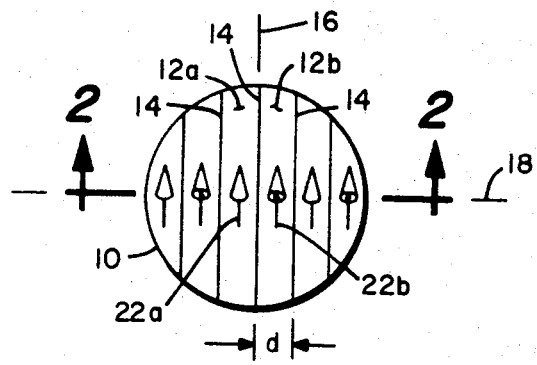
FIG. 1 is a plan view of a magnetic film having its magnetization arranged in a plurality of stripe domains.
Figure 2:
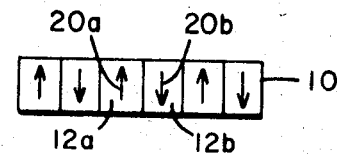
FIG. 2 is a cross-section of the film of FIG. 1 taken along line 2—2.

With particular reference to FIG. 1, there is presented a plan view of a magnetizable film having its magnetization arranged in a plurality of stripe domains. Film 10 may be of either the Faraday or Kerr effect variety but must have the necessary magnetic characteristics to have its magnetization arranged in a plurality of substantially parallel stripe domains 12. The adjacent stripe domains 12a, 12b separated by domain walls 14, have their magnetization 20a, 20b aligned in opposite up-down orientation, at an angle to the plane (surface) of the film, as illustrated in the hereinbefore referenced R. J. Spain, et al., article and their average magnetization 22a, 22b aligned in the plane of the film. For purposes of orientation, orthogonal axes 16, parallel to domain wall 14, and 18 are provided in the plane of the film 10. With particular reference to to FIG. 2 there is presented a cross-section of the film 10 taken along line 2—2 schematically illustrating the opposite up-down orientation of the magnetization of adjacent stripe domains 12a, 12b by the respectively associated vectors 20a, 20 b, respectively.

It is well known that a monochromatic light beam will be diffracted by a diffraction grating with the angle of deflection of the light beam from the plane of the diffraction grating depending upon the spacing between the gratings. The diffraction angle of the light beam can then be varied by either adjusting the grating spacing or by changing the orientation of the grating, or both. Based upon this principle, a light beam deflector capable of deflecting a monochromatic polarized light beam to any point in a plane may be effected by the present invention for use in optical systems such as optical memories, pattern scanning, etc.

When magnetic films are thicker than a certain critical thickness, which in turn depends on the film composition, type of substrate, substrate temperature, deposition method and rate, incident angle, etc., a type of magnetic domain structure, descriptively called stripe domains will appear. See the article by M. M. Hanson, et al., Journal of Applied Physics, Letters, Vol. 9, page 99, 1966. Components of the magnetization of the stripe domains, as illustrated in FIG. 2, alternately are directed in an up-down manner, at an angle to the plane surface of the film 10, with a substantially constant periodicity, which domain wall separation, or stripe domain width, has been observed as being in the range from 1,000 angstroms (A) to 40,000 A.

The theory in which the magnetization varies only as a function of the distance in the film plane perpendicular to the stripe direction and not as a function of distance normal to the film plane or distance along the stripe direction has predicted that the stripe domain spacing is a function of the amplitude of the (periodic) component of the magnetization normal to the film plane (see for example N. Saito, et al. Journal of The Physical Society of Japan, Vol. 19, No. 7, page 1,116, July 1964). Experimentally in that same article the stripe width was reported not to vary when the normal component of the magnetization was changed by applying a field parallel to the stripes. This disagreement is attributed to the coercive force of the stripe domains.

The inventors have found that the application of an oscillating field above some critical value in the plane of the film and normal to the stripe domains overcomes the coercivity associated with the stripe domains and allows the stripe domain spacing to relax to that of a lower energy state. This discovery allows light to be deflected in two dimensions instead of just one as will be explained later.

The width of the stripe domains, $d$ of FIG. 1, depends on the exchange constant $A$, the saturation magnetization $M_o$, the thickness $t$, and the angle $\theta_o$ between the magnetization in the center of the domain and the film plane. See the article by N. Saito et al. Journal of the Physical Society of Japan, Volume 19, No. 7 page 1,116, July 1964.

$$d = \frac{2At}{M_0^2} 1/3 \left\{ \frac{\theta_0}{\cos \theta_0 [1/(\pi/2 - \theta_0) - 1/(\pi/2 + \theta_0)]} \right\} 2/3$$

Figure 3:
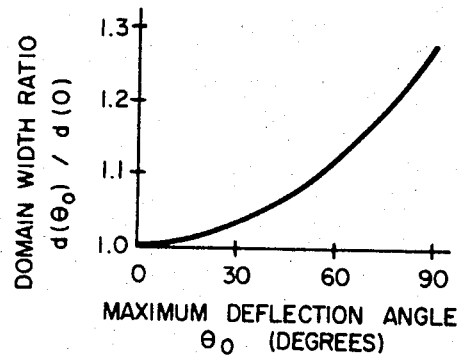
FIG. 3 is a plot of domain width ratio versus maximum deflection angle for stripe domain film.
Figure 4:
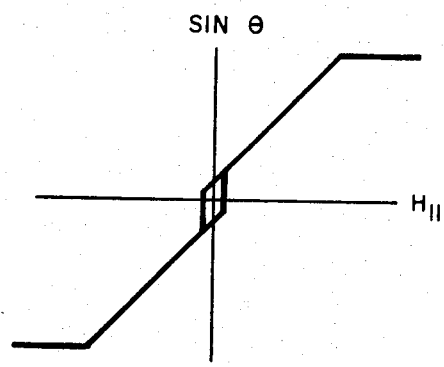
FIG. 4 is an illustration of a typical hysteresis loop of a stripe domain film.

That angle $\theta_o$ depends strongly on the magnitude of the applied field in the direction of the average magnetization which is parallel to an in the plane of the film and in the direction of the arrows 22a, 22b; when a field is applied parallel to the average magnetization, $\theta_o$ becomes smaller; when a field is applied antiparallel to the average magnetization, $\theta_o$ becomes larger. With particular reference to FIG. 3 there is presented a plot of stripe domain width ratio versus maximum deflection angle for a stripe domain film wherein it can be seen that the stripe domain width may be varied by approximately 30 percent while FIG. 4 illustrates a typical hysteresis loop plot of DC field parallel to the stripe domains versus Sin $\theta$.

Figure 5:
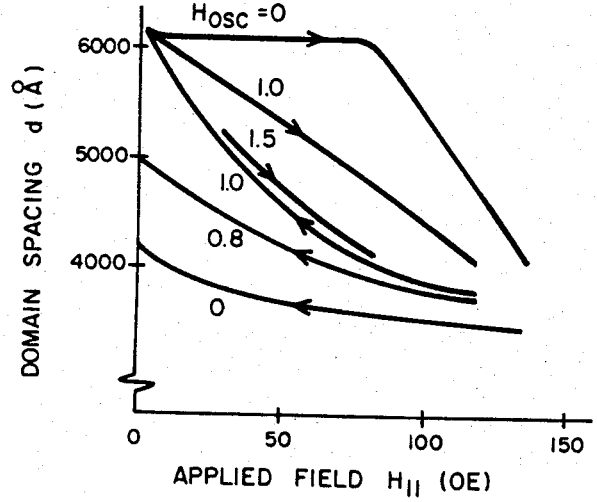
FIG. 5 is an experimental plot of stripe domain spacing in a Ni - Fe film as a function of the amplitude of a DC field applied parallel to the stripe domains with the magnitude of the oscillating field in the plane perpendicular to the stripe domains as a parameter.

The characteristics of the stripe domain coercivity were investigated by measuring the spacing versus the intensity of the field applied parallel to the magnetization with the oscillating field as a parameter. Vapor deposited (at 20 A/sec in $5 \times 10^{-6}$ torr) 82% Ni-18% Fe films of thickness from 2,000 to 32,000 A with substrate temperature from 200 to 300°C, were studied. FIG. 5 shows a set of representative curves. Two groups of curves are shown: one shows the variation of spacing when the field $H_{11}$ intensity is decreased and the other when $H_{11}$ intensity is increased. Note that these two groups of curves are not coincident and some kind of hysteresis is present. When $H_{osc} = 0$, the spacing increases only slightly near $H_{11} = 0$ when $H_{11}$ is being decreased, but the spacing decreases abruptly at 80 oe when $H_{11}$ is being increased. The parameter is given in terms of the critical oscillating field which is the minimum field to rotate the stripes into the oscillating field direction, when $H_{11} = 0$. As $H_{11}$ is increased a larger oscillating field can be used. If the oscillating field is too large for the accompanying $H_{11}$, the regular stripe pattern will be disturbed and no spacing can be observed. This is the reason why a part of the $H_{osc} = 1.5\ H_{cr}$ curve, where $H_{11}$ is small, cannot be obtained. The results from various films show that the coercivity associated with stripe domains increases with the film thickness, decreases with increasing substrate temperature during film deposition, and no apparent correlation with the ordinary coercive force $H_c$ has been observed.

The rotational orientation of the stripe domains 14 may also be changed continuously; the stripe domains will become aligned in the direction of a large applied field parallel to the plane of the film 10. Thus, the magnitude of the applied field determines the spacing between stripe domains, or stripe domain width, while the angle of the applied field determines the rotational orientation of the stripe domains and, consequently, the axis 16 of FIG. 1.

Two types of diffraction grating utilizing stripe domains 14 of a stripe domain film are as follows:

I. Parallel lines formed by Bitter powder on a stripe domain magnetizable film.

Figure 6:
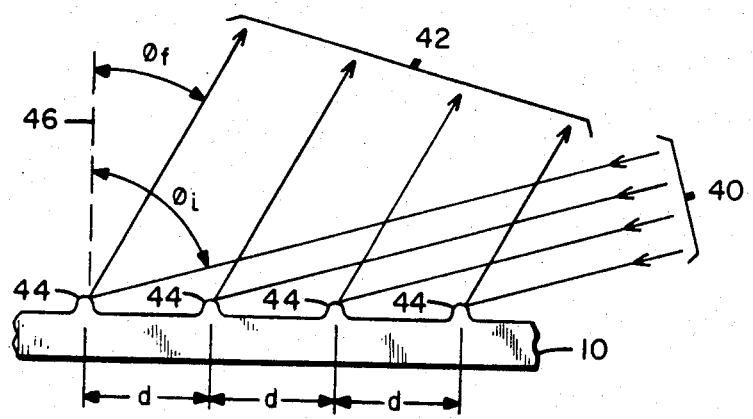
FIG. 6 is an illustration of the effect of a Bitter powder pattern of a stripe domain film upon an incident monochromatic light beam.

When the Bitter powder solution is put upon a stripe domain film, a parallel line pattern over the stripe domains will be formed due to the presence of the stray magnetic field from the stripe domains. The Bitter powder solution, or colloidal suspension, on these domain stripes functions as a diffraction grating. With particular reference to FIG. 6 there is presented an illustration of the effect of a Bitter powder pattern on a film 10 on an incident monochromatic light beam 40. The deflected light beam 42 from such a diffraction grating can be affected in at least two ways. The deflection angle $\phi_f$ of a deflected light beam 42 from an axis 40 normal to the plane of the durface of film 10 can be varied by varying the stripe domain spacing $d$ as shown in FIGS. 1 and 6 while the rotational orientation of the deflected light beam 42 can be varied by as much as 360° by varying the orientation of the stripe domains, or diffraction grating, about the axis 46.

The domain stripes 14 have a coercive force $H_c$ which tends to prevent changes in domain stripe spacing. It is therefore necessary to overcome this coercive force with an oscillating (AC) field directed substantially orthogonal to the average magnetization, i. e., in the plane of the film 10 and substantially perpendicular to the domain walls 14 as illustrated by vectors 22a, 22b along axis 16 of FIG. 1 which oscillating field rotates the magnetization of the stripe domains 14 back and forth and shakes their magnetization down to its lowest energy state. Using such an oscillating field, the inventors have observed the change in stripe domain spacing and the corresponding change in light beam deflection.

The amount of deflection to be expected from a change in the distance $d$ of stripe domain width may be calculated as follows: let $\lambda$ be the wavelength of the light, let $\phi_f$ be the angle between the deflected light maximum and the plane normal. Then the maximum of the deflected amplitude occurs when $d (\sin \phi_i + \sin \phi_f) = n \lambda$
Let $n = 1$, $\lambda = 6,328A$, let $\phi_i = 50°$, $\phi_f = 75$
$d = 6,328A/(0.966 + 0.766) = 3,650A$
$\sin \phi_f = (n \lambda/d) - \sin \phi_i$
holding $\phi_i$ constant,
$\cos \phi_f \, \phi_f = (n \lambda/d) (\delta \, d/d)$
$\delta \phi_f = (\delta \, d/d) (-n \lambda/d \cos \phi_f)$
$= (-\delta \, d/d) (6,328/3,650 \times 0.26) = (= \delta \, d/d) (6.67)$
$\delta \phi_f = 6.67 (\delta \, d/d)$ The above indicates that $a \pm 10$ percent change in stripe domain spacing $d$ causes a change in $\phi_f$ of $\pm 0.67$ radians or $\pm 38.4°$. As stripe domain spacing $d$ may be varied continuously over a range of approximately 30 percent the light beam may be deflected over a very wide range of values. The diffraction efficiency of a colloidal grating 44 such as illustrated in FIG. 6 has been measured — see the publication of E. U. Cohler, et al., Journal of Applied Physics, Vol. 37, pages 27 – 38, 1966 — as being 12 percent while the diffracted light beam width was measured as 2.7° between the 10 percent intensity points and 1° between the 50 percent intensity points. The speed at which such a colloidal grating 44 can be switched is believed to be relatively fast as once the colloidal grating 44 has been formed the magnetizable particles in the colloid are always in the presence of a strong magnetic field from the domain stripes and the distance such a magnetic particle must move is a maximum of 2,000A.

II. Stripe domains and parallel magnetic domains in magnetic films with high Faraday rotation coefficient and low absorption.

Material such as transition metals (Fe, Ni), binary alloys (MnBi) garnets and perovskites (YIG, GdIG, RbNiF$_3$), Trihalides (CrCl$_3$, CrBr$_3$), and chalcogenides (EoO, EuSe) etc., exhibit high Faraday rotation and at certain wavelengths, which in some cases are not in the visible range, have low optical absorption coefficients. When a monochromatic polarized light beam is directed incident to a stripe domain layer, such as film 10 of FIG. 1, made of these above materials, the polarization of the light beam passing through the stripe domains with their magnetization oriented in a first direction such as denoted by vector 20a of FIG. 2 will be rotated in a corresponding direction, such as a counterclockwise direction, while the polarization of the light beam passing through the domains with opposite magnetization orientation, such as vector 20b of FIG. 2, will be rotated in the opposite direction such as in a counterclockwise direction. As an example, if an analyzer were placed on the opposite side of the film 10 from the incident light beam, and if the optical analyzer were adjusted such that the light passing through the odd numbered domains, i.e., every other stripe domain, is blocked off, the result is a many-slit transmission diffraction grating. The first order spot can then be deflected by changing the stripe domain spacing and the rotational orientation of the stripe domains as previously discussed. Actually, the analyzer is not necessary because the light transmitted from the even-numbered stripe domains has a different polarization angle than that from the odd-numbered stripe domains such that at the first order diffraction angle, where the path differences between the light from adjacent stripe domains is a half wavelength, $\lambda/2$, the light does not interfere to complete extinction. If the amplitude of the transmitted light from each stripe domain is $r_0$ before interference with light from a neighboring stripe domain and if the angle of rotation of polarization is $+\beta$ in even-numbered domains and $-\beta$ in odd-numbered domains, the amplitude of the transmitted light after interference may be represented by the equation $r_0 \sin\beta$. Likewise, a reflection diffraction grating may be constructed using the Kerr effect. Even non-stripe domain films may be used if they exhibit an even, closely packed parallel domain structure with the magnetization in the film plane but antiparallel in adjacent stripe domains if the incident light beam is incident at an angle to the normal to the film.

A reflection grating can be constructed also by using a Faraday effect material and a mirror. If one surface of a stripe domain Faraday effect film is coated with a mirror, the light passing through each stripe will be reflected by the mirror and will pass back out the film, thereby gaining twice the Faraday rotation. Alternatively, one can use a combination of a metallic stripe domain film with good reflectivity but poor Kerr coefficient together with a magnetically softer non-stripe domain material with a good Faraday effect. The stripe domains of the reflective film will induce flux closure paths in the Faraday effect material which yield the requisite periodic Faraday rotation for light deflection.

A wide variety of materials is available. Stripe domains have been observed in Ni, NiFe, MnBi and YIG, and, theoretically, should be found in all the materials mentioned at the beginning of this section. The figure of merit of such materials is defined as twice the ratio of the Faraday rotation per centimeter divided by the absorption in nepers per centimeter. For Permalloy this figure of merit is 0.4 at $\lambda = 5,000A$, for Ni it is 3.4 at $\lambda = 40,000$ A, for MnBi it is 3.2 at $\lambda = 7,500$ A, for YIG it is 6,900 at $\lambda = 12,000$ A, for CrI$_3$ it is 53 at $\lambda = 10,000$ A and at 1.5°K, for CrBr$_3$ it is 23 at $\lambda = 4,930$ A and 1.50°K for EuO it is 11 at 6,600 A and at 8°K and for EuSe it is 7,300 at 7,550 A and at 4.2°K. One application of such a device may be made by replacing a mirror of a laser beam by a stripe domain film; the result will be a laser beam with a high intensity output the direction of which is controllable by a magnetic field. The same result may be obtained by inserting a Faraday effect stripe domain film between the mirrors of a laser beam.

Figure 7A:
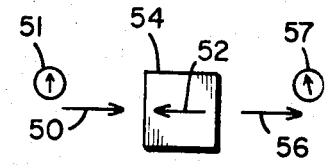
FIGS. 7a, 7b, 7c are illustrations of the effect of a Faraday effect stripe domain film upon a normally incident monochromatic light beam.
Figure 7B:
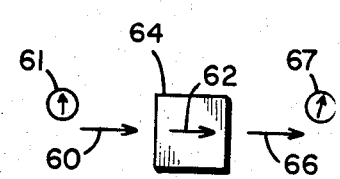
Figure 7C:
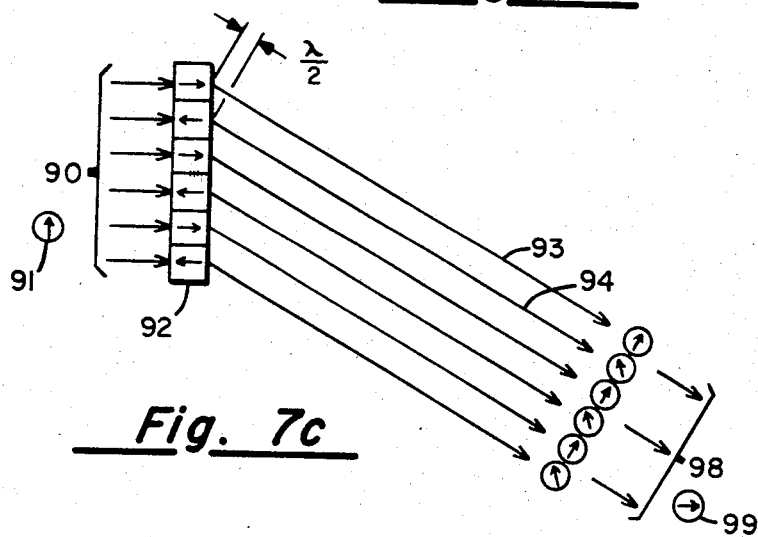
Figure 8A:
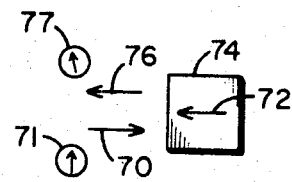
FIGS. 8a, 8b, 8c are illustrations of the effect of a Kerr effect stripe domain film upon a normally incident monochromatic light beam.
Figure 8B:
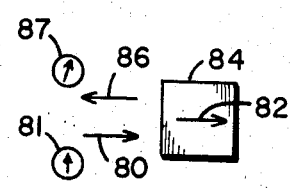
Figure 8C:
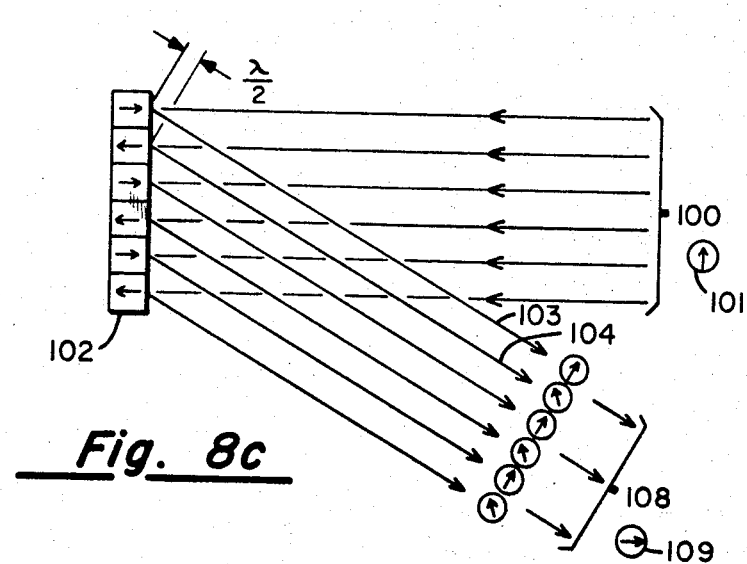

With particular reference to FIGS. 7a, 7b, 7c there are presented illustrations of the effect of a Faraday effect stripe domain film upon a normally incident polarized monochromatic light beam while with particular reference to FIGS. 8a, 8b, 8c there are presented illustrations of the effect of a Kerr effect stripe domain upon a normally incident polarized monochromatic light beam.

FIG. 7a diagrammatically illustrates how the incident light beam 50 having the upward polarization 51, is affected by the antiparallel magnetization 52 of Faraday effect stripe domain 54 causing the transmitted light beam 56 to have the counterclockwise polarization 57.

FIG. 7b diagrammatically illustrates how the incident light beam 60, having the upward polarization 61, is affected by the parallel magnetization 62 of Faraday effect stripe domain 64 causing the transmitted light beam 66 to have the clockwise polarization 67.

FIG. 8a diagrammatically illustrates how the incident light beam 70, having the upward polarization 71, is affected by the antiparallel magnetization 72 of Kerr effect stripe domain 74 causing the reflected light beam 76 to have the counterclockwise polarization 77.

FIG. 8b diagrammatically illustrates how the incident light beam 80, having the upward polarization 81, is affected by the parallel magnetization 82 of Kerr effect stripe domain 84 causing the reflected light beam 86 to have the clockwise polairzation 87.

FIG. 7c diagrammatically illustrates how the incident light beam 90, having the upward polarization 91, is affected by the Faraday effect film 92 having a plurality of adjacent, opposite magnetization polarization, parallel/antiparallel, stripe domains causes the transmitted light beam having a plurality of adjacent clockwise/counterclockwise rotated components 93, 94 to produce a first order light beam 98 having the right-ward polarization 99 when the deflection angle of the transmitted light beam 98 from the normal to the plane of film 92 is such as to cause the difference in component light beam lengths to be one-half the wavelength $\lambda$ of the light beam 98 components 93, 94.

FIG. 8c diagrammatically illustrates how the incident light beam 100, having the upward polarization 101, is affected by the Kerr effect film 102 having a plurality of adjacent, opposite magnetization polarization, parallel/antiparallel stripe domains causes the reflected light beam, having a plurality of adjacent clockwise/counterclockwise rotated components 103, 104, to produce a first order light beam 108 having the rightward polarization 109 when the deflection angle of the deflected light beam 108 from the normal to the plane of film 102 is such as to cause the difference in component beam lengths to be one-half the wavelength $\lambda$ of the light beam 108 components 103, 104.

Figure 9:
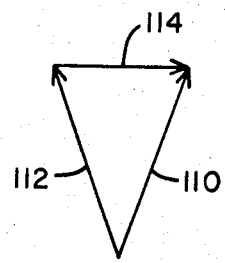
FIG. 9 is an illustration of the vector resolution of the effect of the rotation of the plane of a monochromatic light beam rotated by a Faraday or a Kerr effect stripe domain film.

With particular reference to FIG. 9 there is presented an illustration of the vector resolution of the effect of the rotation, of the polarization plane, of a monochromatic polarized light beam when rotated by a Faraday or a Kerr effect stripe domain film as discussed with particular reference to FIGS. 7a, 7b, 7c and FIGS. 8a, 8b, 8c. With the adjacent, reflected or transmitted, light beam components having the clockwise rotated polarization represented by vector 110 and the counterclockwise rotated polarization represented by vector 112 such vectors are vectorily subtracted, one from the other, producing the right-ward vector 114 which is as illustrated in FIGS. 7c and 8c.

Figure 10:
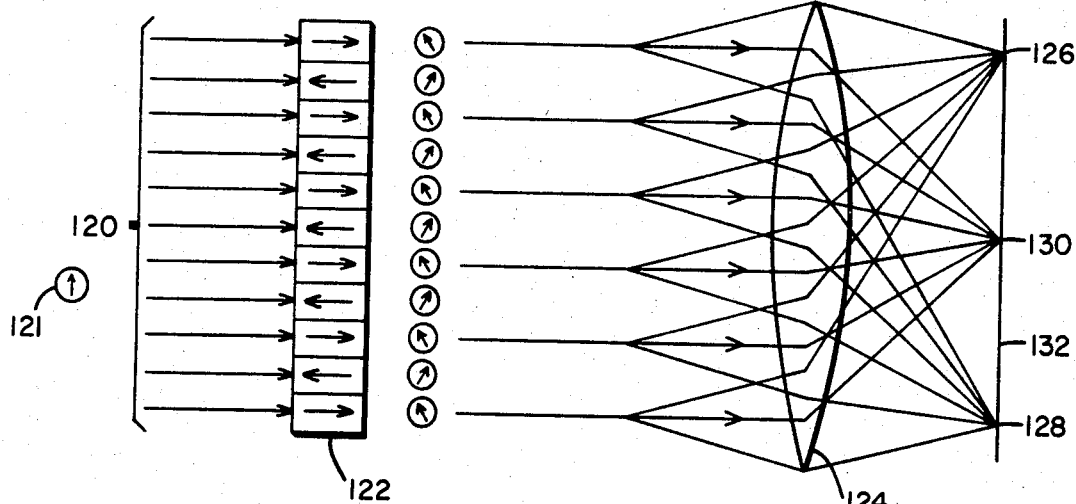
FIG. 10 is an illustration of a lens system that may be utilized with a Faraday effect stripe domain film.

With particular reference to FIG. 10 there is presented an illustration of a lens system that may be utilized with a Faraday effect stripe domain film. In this lens system the normally incident light beam 120 having the upward polarization 121 is transmitted by the Faraday effect stripe domain film 122, having a plurality of adjacent opposite magnetization polarization stripe domains, upon lens 124. The transmitted light beam is split, or componented, into upward first order image components, downward first order image components and straight ahead 0'th order image components, by film 122, with lens 124 focusing such components at points 126, 128, 130, respectively, on plane 132, which plane is normal to the transmission axis of light beam 120. By varying the stripe domain wall separation of film 122 the angle of deflection of the transmitted light beam may be varied while by varying the rotational orientation of the stripe domains of film 122 about the transmission axis of light beam 120 the angle of rotation of the transmitted light beam may be varied. This variation of the deflection angle and of the rotation angle permits the points 126, 128, 130 to be established at almost any position in the two-dimensional plane 132. This variation of the deflection angle and of the rotation angle is a novel feature of the present invention and will be explained in more detail with particular reference to FIGS. 11, 12a, 12b, 13.

Figure 11:
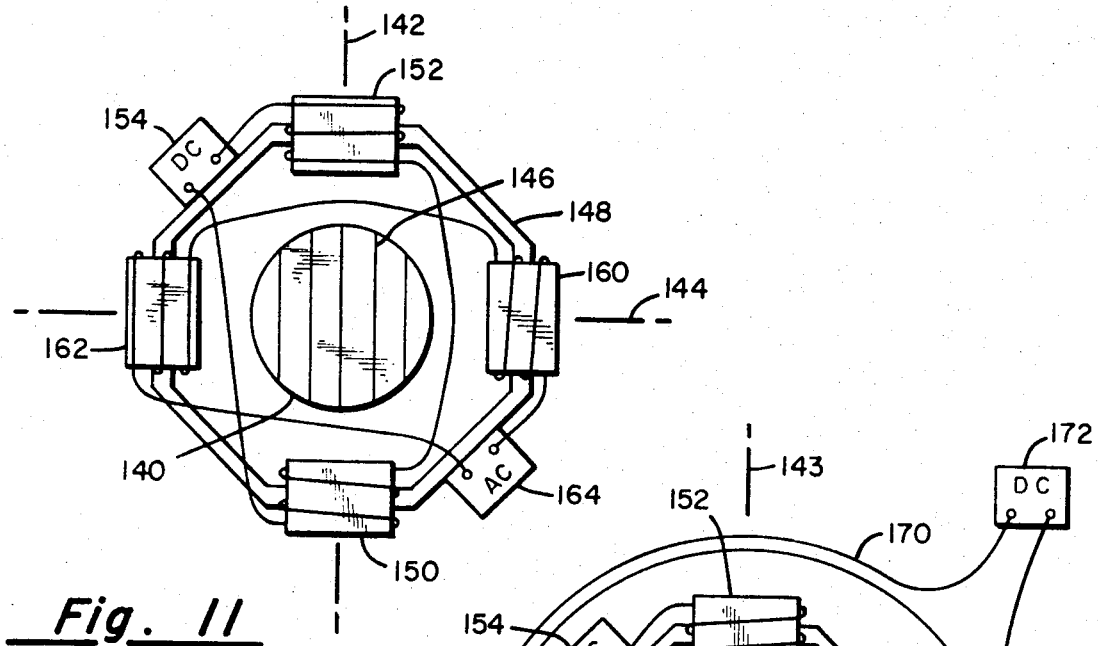
FIG. 11 is an illustration of the device for applying orthogonal AC, DC fields parallel to the plane of a stripe domain film.

With particular reference to FIG. 11 there is presented an illustration of a device for applying orthogonal AC, DC fields parallel to the plane of stripe domain film 140 which may be similar to film 10 of FIG. 1. Film 140 has associated therewith two orthogonal axes 142, 144, in the plane of film 140, with axis 142 oriented parallel to the stripe domain walls 146. About film 140 is a yoke 148, rotatable about an axis that is normal to the plane of film 140 and that passes through the intersection in the plane of film 140 of axes 142, 144, upon which are mounted: DC field coils 150, 152 and the associated DC drive signal source 154; and AC field coils 160, 162 and the associated AC drive signal source 164. As stated hereinabove, when a magnetic film 140 having its magnetization arranged in a plurality of stripe domains is effected by a DC field parallel to, or in, the plane of the film and parallel or antiparallel to the magnetization polarization of the stripe domains the stripe domain width d is made to vary: when the applied DC field is parallel to the magnetization polarization the stripe domain width $d$ decreases; when the applied DC field is antiparallel to the magnetization polarization the stripe domain width $d$ increases. However, the stripe domains have a coercive force associated therewith that tends to prevent changes in stripe domain width $d$. It is therefore necessary to overcome this coercive force with an oscillating (AC) field that is directed in the plane of the film and perpendicular to the stripe domain walls, and, correspondingly, the average magnetization polarization.

Figure 12A:
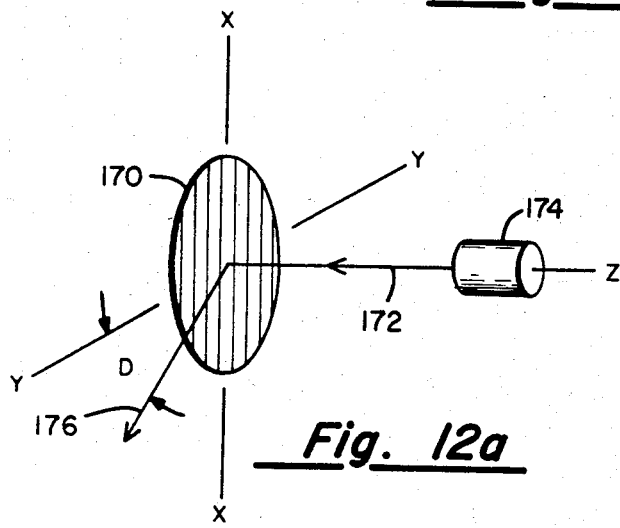
FIGS. 12a, 12b is an illustration of the effect of the device of FIG. 11 for varying the angle of deflection of a monochromatic light beam that is normally incident to a Kerr effect stripe domain film.
Figure 12B:
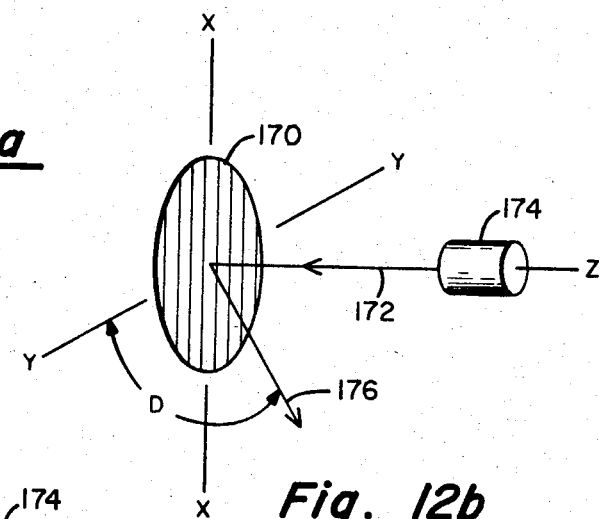

With particular reference to FIGS. 12a, 12b there are presented illustrations of the effects of the device of FIG. 11 for varying the angle of deflection D of a monochromatic light beam that is directed normally incident to a Kerr effect film 170. Here the light beam 172, directed along the axis Z of the orthogonal set of axes XYZ from source 174, is deflected a differing deflection angle D to a deflected light beam 176 in the YZ plane as a function of the greater or lesser domain spacing of FIGS. 12a, 12b, respectively. The deflection angle D, inter alia as discussed above, is also a function of the polarity and intensity of the DC field that is applied along the X axis. This operation is achieved by the orientation of the XY axes of FIGS. 12a, 12b in spatial correspondence with axes 144, 142, of FIG. 11.

A further effect upon the normally incident light beam involves the rotation of the axes 144, 142, of FIG. 11 with respect to the yoke 148, and, correspondingly, the orthogonal DC and AC drive fields. In this operation, the deflection light beam is rotated out of its previously deflected orientation in plane YZ as in FIGS. 12a, 12b into any one of an infinite number of rotational angles 0° – 360° about axis Z. With particular reference to FIG. 3 there is presented an illustration of the effect of the device of FIG. 11 for varying the angle of rotation of a monochromatic light beam that is directed normally incident to a Kerr effect film 170.

Figure 13:
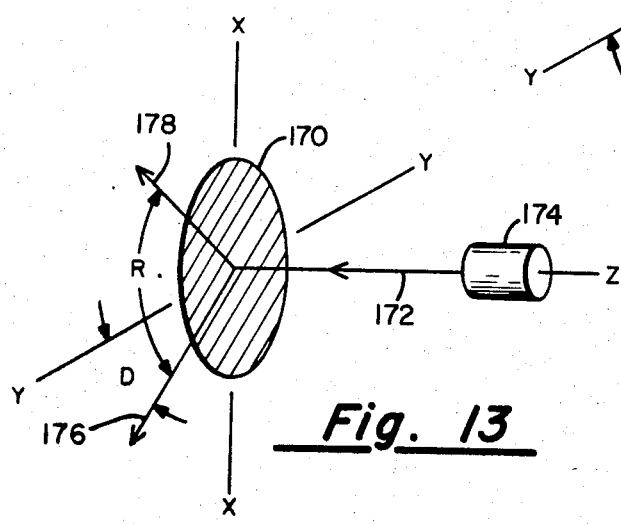
FIG. 13 is an illustration of the effect of the device of FIG. 11 for varying the angle of rotation of a monochromatic light beam that is normally incident to a Kerr effect stripe domain film.

For the deflection/rotation operation of FIG. 13 the axes 144, 142 of FIG. 11 are rotated a rotation angle R out of spatial correspondence with the XY axes of FIG. 13. Now the DC field is directed at a rotated angle R with respect to the original average magnetization polarization, and, correspondingly, the stripe domain walls 146 as illustrated in FIG. 11, causing the average magnetization polarization, and correspondingly the stripe domain walls 146, to rotate through the rotation angle R. This operation is accomplished in the embodiment of FIG. 11 by merely rotating the DC field from the coils 150, 152 and the orthogonal AC field from the coils 160, 162, with respect to film 140 in its orthogonal axes 142, 144 through a rotation angle R. Here, the light beam 172, directed along the Z axis of the orthogonal set of axes XYZ, from the source 174 is deflected a deflection angle D measured in the YZ plane and is rotated a rotation angle R measured from the YZ plane about axis Z.

In practice a given field will be rotated electrically by adjusting the sign and magnitude of two orthogonal components. In the configuration where a Kerr effect film is used or a Faraday effect film with a mirror, the field is most easily supplied by strip lines behind the film.

Figure 14:
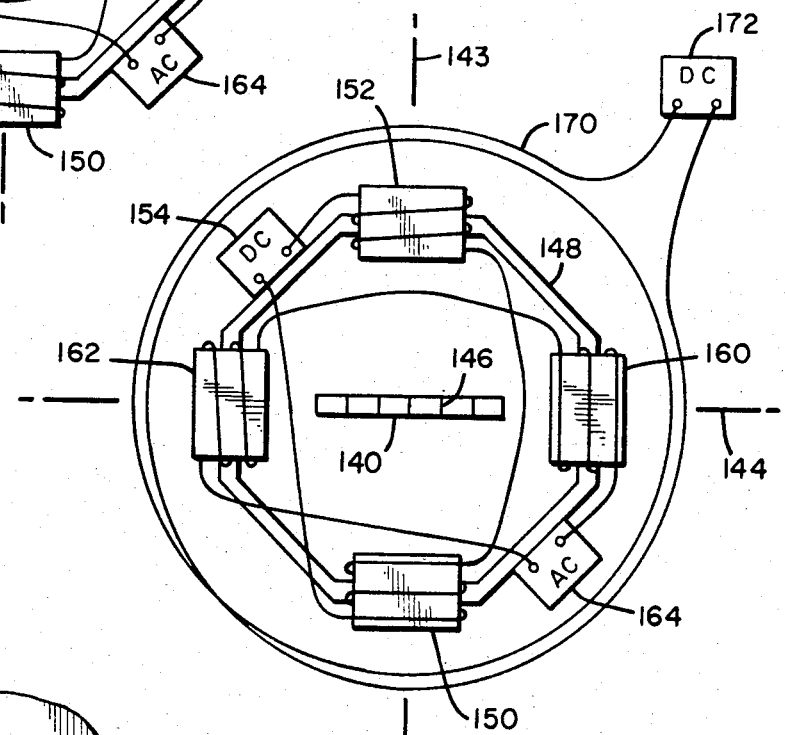
FIG. 14 is an illustration of a modification of the device of FIG. 11 including an additional DC field parallel to the plane of the film and the domain walls.

A further embodiment of the present invention, in contrast to the embodiment of FIG. 11, may be achieved by rotating the yoke 148 of FIG. 11 90° about axis 144 into alignment with an axis 143 which is orthogonal to the plane of stripe domain film 140, whereby axes 142, 143, 144 form a set of three orthogonal axes. With particular reference to FIG. 14 there is presented an illustration of the device of FIG. 11 rotated about the axis 144 that is in the plane of the stripe domain film 140 and that is orthogonal to the magnetization polarity of the stripe domains 146 for providing: by AC field coils 160, 162 and the associated AC drive signal source 164 an AC field along axis 144 that is orthogonal to the stripe domain walls 146 of stripe domain film 140 and parallel to the plane thereof; and, by DC field coild 150, 152 and the associated DC drive signal source 154 a DC field along axis 143 that is orthogonal to the plane of stripe domain film 140. Further, there is provided an additional DC field coil 170 and the associated DC drive signal source 172 for providing a DC field parallel to the stripe domain walls 146 of stripe domain film 140 and parallel to the plane thereof.

For operation of the device of FIG. 14 the AC field is applied to stripe domain film 140:

for achieving a change in stripe domain width d and a corresponding change in deflection angle in stripe domain film 140, the DC coils 150, 152 apply the associated DC field, of a first or of a second and opposite polarity, orthogonal to the plane of stripe domain film 140 causing the stripe domain width d to vary accordingly;

for causing a change in rotation angle of the stripe domain walls 146 of stripe domain film 140 the DC coil 170 is rotated about axis 143 causing a corresponding change in the rotation angle of the stripe domain walls 146 of stripe domain film 140.

Figure 15:
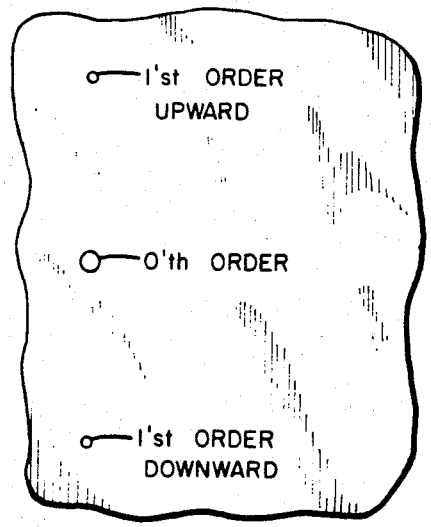
FIG. 15 is a representation of a photograph of the image on a screen of a HeNe laser beam after having passed through a Yittrium-iorn-garnet stripe domain film. The central spot is the undeflected beam and the two outside spots are the deflected first order diffraction spots.

FIG. 15 shows the zeroth order spot and the two first order diffraction spots resulting from shining a HeNe laser beam through a stripe domain YIG film. When magnetic fields are applied to the film the first order spot can be moved in and out and around in a circle. The zeroth order spot remains undeflected. If the proper film thickness and light wavelength are chosen, the central spot will disappear, and all the light will go into the first order.

What is claimed is:
1. A method of continuously varying the domain wall separation of stripe domains in a magnetic film, comprising:
   directing a DC magnetic field along a first axis, which field has a component in the plane of said film that is parallel to said domain walls;
   concurrently directing an AC magnetic field along a second axis, which field has a component that is orthogonal to said domain walls;
   continuously varying the intensity and polarity of said DC magnetic field for generating a correspondingly continuously varying domain wall separation of said stripe domains; and,
   terminating the AC magnetic field when the desired domain wall separation is achieved.
2. The method of claim 1 in which the said component of said AC magnetic field is above a critical value sufficient to overcome the stripe domain associated coercivity and to allow the stripe domain spacing to relax to a lower energy state.
3. The method of claim 2 in which said critical value is the minimum field intensity necessary to rotate the stripe domains into the direction of said component of said AC magnetic field when the DC magnetic field intensity equals zero.
4. A method of continuously varying the domain wall separation and the orientation of stripe domains in a magnetic film, comprising:
   directing a DC magnetic field along a first axis, which field has a component in the plane of the film that is in the direction of the desired domain orientation;
   concurrently directing an AC magnetic field along a second axis, which field has a component that is orthogonal to the said desired domain orientation ;
   continuously varying the intensity and polarity of said DC magnetic field for generating a correspondingly continuously varying domain wall separation of said stripe domains while concurrently orienting said stripe domains in said desired domain orientation; and,
   terminating the AC magnetic field when the desired domain wall separation and stripe domain orientation have been achieved.
5. The method of claim 4 in which the said component of said AC magnetic field is above a critical value sufficient to overcome the stripe domain associated coercivity and to allow the stripe domain spacing to relax to a lower energy state.
6. The method of claim 5 in which said critical value is the minimum field intensity necessary to rotate the stripe domains into the direction of said component of said AC magnetic field when the DC magnetic field intensity equals zero.
7. A method of continuously varying the angle of deflection of an incident monochromatic light beam impinging upon the planar surface of a Kerr effect magnetic film having its magnetization arranged in a plurality of parallel, equal-width stripe domains separated by domain walls that are oriented parallel to a first axis in the planar surface of the film, comprising:

directing said monochromatic light beam along a second axis that is normal to the planar surface of said Kerr effect magnetic film;

generating opposite Kerr effect rotations of the plane of polarization of the respective incident portions of said light beam by the respective adjacent stripe domains of said film;

deflecting the direction of said light beam by said opposite Kerr effect rotations of said light beam an angle D out of the plane of said film and in a first plane formed by said second axis and a third axis that is in the plane of said film and is orthogonal to said first axis;

directing a DC magnetic field along said first axis in the plane of said film;

directing an AC magnetic field along said third axis continuously varying the intensity and polarity of said DC magnetic field in the presence of said AC magnetic field;

continuously varying the domain wall separation $d$ of said stripe domains as a function of the continuously varying intensity and polarity of said DC magnetic field;

continuously varying the angle D of deflection in said first plane of said deflected light beam from the planar surface of said film as the function of said continuously varying domain wall separation $d$.

8. The method of claim 7 further including rotating said deflected light beam by:

rotating said orthogonally oriented first and third axes and their associated DC magnetic field and AC magnetic field, respectively, in the planar surface of said film and about said second axis by a rotation angle R;

rotating said domain walls through said rotation angle R as determined by said rotated first and third axes;

rotating said deflected light beam said rotation angle R out of said first plane into a second plane formed by said second axis and said rotated third axis;

varying the angle R of rotation of said rotated deflected light beam about said second axis and between said first and second planes.

9. The method of claim 7 in which the intensity of said AC magnetic field is above a critical value sufficient to overcome the stripe domain associated coercivity and to allow the stripe domain spacing to relax to a lower energy state.

10. The method of claim 9 in which said critical value is the minimum field intensity necessary to rotate the stripe domains into the AC magnetic field direction when the DC magnetic field intensity equals zero.

11. The method of continuously varying the domain wall separation of stripe domains in a magnetic film, comprising:

directing a DC magnetic field along a first axis that is in the plane of said film and parallel to said domain walls;

directing an AC magnetic field along a second axis that is in the plane of said film and orthogonal to said first axis while concurrently directing said DC magnetic field along said first axis; and, continuously varying the intensity and polarity of said DC magnetic field for generating a correspondingly continuously varying domain wall separation of said stripe domains.

12. The method of claim 11 in which the intensity of said AC magnetic field is above a critical value sufficient to overcome the stripe domain associated coercivity and to allow the stripe domain spacing to relax to a lower energy state.

13. The method of claim 12 in which said critical value is the minimum field intensity necessary to rotate the stripe domains into the AC magnetic field direction when the DC magnetic field intensity equals zero.

14. A method of continuously varying the angle of deflection of an incident monochromatic light beam impinging upon the planar surface of a Faraday effect magnetic film having its magnetization arranged in a plurality of parallel, equal-width stripe domains separated by domain walls that are oriented parallel to a first axis in the planar surface of the film, comprising:

directing said monochromatic light beam along a second axis that is normal to the planar surface of said Faraday effect magnetic film;

generating opposite Faraday effect rotations of the plane of polarization of the respective incident portions of said light beam by the respective adjacent stripe domains of said film;

deflecting the direction of said light beam by said opposite Faraday effect rotations of said light beam an angle D out of the plane of said film and in a first plane formed by said second axis and a third axis that is in the plane of said film and is orthogonal to said first axis;

directing a DC magnetic field along said first axis in the plane of said film;

directing an AC magnetic field along said third axis;

continuously varying the intensity and polarity of said DC magnetic field in the presence of said AC magnetic field;

continuously varying the domain wall separation d of said stripe domains as a function of the continuously varying intensity and polarity of said DC magnetic field;

continuously varying the angle D of deflection in said first plane of said deflected light beam from the planar surface of said film as the function of said continuously varying domain wall separation $d$.

15. The method of claim 14 further including rotating said deflected light beam by:

rotating said orthogonally oriented first and third axes and their associated DC magnetic field and AC magnetic field, respectively, in the planar surface of said film and about said second axis by a rotation angle R;

rotating said domain walls through said rotation angle R as determined by said rotated first and third axes;

rotating said deflected light beam said rotation angle R out of said first plane into a second plane formed by said second axis and said rotated third axis;

varying the angle R of rotation of said rotated deflected light beam about said second axis and between said first and second planes.

16. The method of claim 14 in which the intensity of said AC magnetic field is above a critical value sufficient to overcome the stripe domain associated coercivity and to allow the stripe domain spacing to relax to a lower energy state.

17. The method of claim 16 in which said critical value is the minimum field intensity necessary to rotate the stripe domains into the AC magnetic field direction when the DC magnetic field intensity equals zero.

* * * * *

UNITED STATES PATENT OFFICE
CERTIFICATE OF CORRECTION

Patent No. 3,752,563      Dated August 14, 1973

Inventor(s) Ernest J. Torok et al.

It is certified that error appears in the above-identified patent and that said Letters Patent are hereby corrected as shown below:

Column 11, line 16, after "along said third axis" insert a semicolon.

Signed and sealed this 1st day of January 1974.

(SEAL)
Attest:

EDWARD M. FLETCHER, JR.
Attesting Officer

RENE D. TEGTMEYER
Acting Commissioner of Patents